US012508692B2

(12) United States Patent
Kukucka et al.

(10) Patent No.: US 12,508,692 B2
(45) Date of Patent: Dec. 30, 2025

(54) ANTI-SLIP TORQUE TOOL

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 541 days.

(21) Appl. No.: 17/460,896

(22) Filed: Aug. 30, 2021

(65) Prior Publication Data

US 2021/0387312 A1 Dec. 16, 2021

Related U.S. Application Data

(63) Continuation-in-part of application No. PCT/IB2020/058278, filed on Sep. 4, 2020, and a continuation-in-part of application No. 17/006,272, filed on Aug. 28, 2020, now Pat. No. 11,103,983, said application No. PCT/IB2020/058278 is a continuation-in-part of application No. 17/006,272, filed on Aug. 28, 2020, which is a continuation-in-part of application No. 16/033,970, filed on Jul. 12, 2018, now Pat. No. 10,786,890.

(Continued)

(51) Int. Cl.

| | |
|---|---|
| ***B25B 13/00*** | (2006.01) |
| ***B25B 13/08*** | (2006.01) |
| ***B25B 23/10*** | (2006.01) |

(52) U.S. Cl.

CPC ............ *B25B 13/08* (2013.01); *B25B 23/105* (2013.01)

(58) Field of Classification Search

CPC ......... B25B 23/08; B25B 13/10; B25B 13/08; B25B 13/065; B25B 13/06; B25B 23/10; B25B 13/16

USPC ............ 81/121.1, 186, 124.3, 70, 119, 124.6

See application file for complete search history.

(56) References Cited

U.S. PATENT DOCUMENTS

| | | | |
|---|---|---|---|
| 1,798,944 | A | 3/1931 | Jackman |
| 3,405,377 | A | 10/1968 | Pierce |

(Continued)

FOREIGN PATENT DOCUMENTS

| | | |
|---|---|---|
| AU | 201612229 | 4/2016 |
| AU | 201612720 | 6/2016 |

(Continued)

*Primary Examiner* — Katina N. Henson

(57) ABSTRACT

An anti-slip torque tool that utilizes a plurality of grooves to prevent slippage and facilitate torque transfer to a fastener. The tool includes a wrench torque-tool body and an at least one engagement element. The wrench torque-tool body includes a plurality of internal sidewalls, a first base, and a second base. Further, each of the internal sidewalls includes a bracing surface. The engagement element includes at least one first groove and at least one second groove, wherein each further includes a primary cavity and a secondary cavity. The engagement element is laterally integrated into a specific sidewall to provide additional gripping action. The first groove and the second groove are positioned offset from each other, along the bracing surface of the specific sidewall. The primary cavity and the secondary cavity each traverse normal and into the bracing surface from the first base to the second base.

27 Claims, 12 Drawing Sheets

Related U.S. Application Data

(60) Provisional application No. 62/639,619, filed on Mar. 7, 2018, provisional application No. 62/531,828, filed on Jul. 12, 2017.

(56) References Cited

U.S. PATENT DOCUMENTS

| | | | | |
|---|---|---|---|---|
| 3,495,485 | A | 2/1970 | Knudsen et al. | |
| 3,902,384 | A | 9/1975 | Ehrler | |
| 3,908,489 | A | 9/1975 | Yamamoto et al. | |
| 4,893,530 | A | 1/1990 | Warheit | |
| 4,927,020 | A | 5/1990 | Randy | |
| 4,930,378 | A | 6/1990 | Colvin | |
| 5,019,080 | A | 5/1991 | Hemer | |
| 5,219,392 | A | 6/1993 | Ruzicka et al. | |
| 5,251,521 | A | 10/1993 | Burda et al. | |
| 5,398,823 | A | 3/1995 | Anders | |
| 5,481,948 | A | 1/1996 | Zerkovitz | |
| 5,501,342 | A | 3/1996 | Geibel | |
| 5,519,929 | A | 5/1996 | Bleckman | |
| 5,645,177 | A | 7/1997 | Lin | |
| 5,669,516 | A | 9/1997 | Horn | |
| 5,725,107 | A | 3/1998 | Dembicks | |
| 5,743,394 | A | 4/1998 | Martin | |
| 5,782,148 | A | 7/1998 | Kerkhoven | |
| 5,829,327 | A | 11/1998 | Stanton | |
| 5,832,792 | A | 11/1998 | Hsieh | |
| 6,009,778 | A | 1/2000 | Hsieh | |
| 6,092,279 | A | 7/2000 | Shoup | |
| 6,352,011 | B1 | 3/2002 | Fruhm | |
| 6,431,373 | B1 | 8/2002 | Blick | |
| 6,575,057 | B1 | 6/2003 | Ploeger | |
| 6,698,316 | B1 | 3/2004 | Wright | |
| 6,755,098 | B2 | 6/2004 | Huang | |
| 6,761,089 | B2 | 7/2004 | Bergamo | |
| 6,857,340 | B2 | 2/2005 | Wagner | |
| 7,000,501 | B1 | 2/2006 | Chen | |
| D524,615 | S * | 7/2006 | Albertson | D8/29 |
| 7,225,710 | B2 | 6/2007 | Pacheco | |
| 7,331,260 | B2 | 2/2008 | Cheng | |
| D614,931 | S | 5/2010 | Su | |
| 7,717,278 | B2 | 5/2010 | Kao | |
| 7,788,994 | B2 | 9/2010 | Wright et al. | |
| 7,841,480 | B2 | 11/2010 | Hsieh | |
| 8,166,851 | B2 | 5/2012 | Pchola | |
| 8,302,255 | B2 | 11/2012 | Lin | |
| 8,336,709 | B1 | 12/2012 | Geibel | |
| D745,814 | S * | 12/2015 | Hsieh | D8/29 |
| 9,718,170 | B2 | 8/2017 | Eggert et al. | |
| 9,873,195 | B1 | 1/2018 | Buxton | |
| 9,878,441 | B1 | 1/2018 | Kao | |
| D829,069 | S | 9/2018 | Doroslovac et al. | |
| 10,081,094 | B2 | 9/2018 | Doroslovac et al. | |
| D859,944 | S | 9/2019 | Kukucka et al. | |
| D859,945 | S | 9/2019 | Kukucka et al. | |
| D859,946 | S | 9/2019 | Kukucka et al. | |
| D859,947 | S | 9/2019 | Kukucka et al. | |
| D867,841 | S | 11/2019 | Kukucka et al. | |
| D868,553 | S | 12/2019 | Kukucka et al. | |
| D879,577 | S | 3/2020 | Kukucka et al. | |
| D880,968 | S | 4/2020 | Kukucka et al. | |
| D880,977 | S | 4/2020 | Kukucka et al. | |
| D885,149 | S | 5/2020 | Kukucka et al. | |
| D887,233 | S | 6/2020 | Kukucka et al. | |
| D887,711 | S | 6/2020 | Kukucka et al. | |
| D889,224 | S | 7/2020 | Kukucka et al. | |
| D889,257 | S | 7/2020 | Kukucka et al. | |
| D892,578 | S | 8/2020 | Kukucka et al. | |
| 10,780,556 | B2 | 9/2020 | Kukucka et al. | |
| 10,786,890 | B2 | 9/2020 | Kukucka et al. | |
| D899,091 | S | 10/2020 | Kukucka et al. | |
| 10,828,766 | B2 | 11/2020 | Kukucka et al. | |
| D904,152 | S | 12/2020 | Kukucka et al. | |
| D906,781 | S | 1/2021 | Kukucka et al. | |
| 10,882,162 | B2 | 1/2021 | Kukucka et al. | |
| D909,842 | S | 2/2021 | Kukucka et al. | |
| D910,490 | S | 2/2021 | Lim et al. | |
| 10,919,133 | B2 | 2/2021 | Kukucka et al. | |
| 10,967,488 | B2 | 4/2021 | Kukucka et al. | |
| 11,103,983 | B2 * | 8/2021 | Kukucka | B25B 13/04 |
| 2003/0209111 | A1 | 11/2003 | Huang | |
| 2004/0256263 | A1 | 12/2004 | Shih | |
| 2005/0098459 | A1 | 5/2005 | Gorman | |
| 2005/0103664 | A1 | 5/2005 | Shih | |
| 2005/0257357 | A1 | 11/2005 | Huang | |
| 2006/0156869 | A1 * | 7/2006 | Hsieh | B25B 13/065 81/121.1 |
| 2006/0266168 | A1 | 11/2006 | Pacheco, Jr. | |
| 2007/0261519 | A1 | 11/2007 | Cheng | |
| 2008/0235930 | A1 | 10/2008 | English | |
| 2009/0007732 | A1 | 1/2009 | Hsieh | |
| 2009/0120885 | A1 | 5/2009 | Kao | |
| 2011/0056339 | A1 | 3/2011 | Su | |
| 2011/0303052 | A1 | 12/2011 | Chen | |
| 2012/0060656 | A1 | 3/2012 | Chang | |
| 2013/0047798 | A1 | 2/2013 | Huang | |
| 2014/0260832 | A1 | 9/2014 | Hsiao | |
| 2014/0331826 | A1 | 11/2014 | Campbell | |
| 2015/0266169 | A1 | 9/2015 | Campbell, II | |
| 2015/0314429 | A1 | 11/2015 | Doroslovac | |
| 2016/0067853 | A1 | 3/2016 | Neto | |
| 2016/0136792 | A1 | 5/2016 | Harp | |
| 2016/0223005 | A1 | 8/2016 | Rathmann | |
| 2016/0339564 | A1 | 11/2016 | Chen | |
| 2017/0282337 | A1 | 10/2017 | Johnson et al. | |
| 2017/0312839 | A1 | 11/2017 | Moss et al. | |
| 2018/0003241 | A1 | 1/2018 | Goss | |
| 2018/0354022 | A1 | 12/2018 | Ross et al. | |
| 2018/0354102 | A1 | 12/2018 | Kukucka et al. | |
| 2019/0015961 | A1 | 1/2019 | Wright et al. | |
| 2019/0152033 | A1 | 5/2019 | Kukucka et al. | |
| 2019/0283233 | A1 | 9/2019 | Kukucka et al. | |
| 2019/0337131 | A1 | 11/2019 | Kukucka et al. | |
| 2019/0375077 | A1 | 12/2019 | Kukucka et al. | |
| 2020/0376648 | A1 | 12/2020 | Kukucka et al. | |
| 2020/0391360 | A1 | 12/2020 | Kukucka et al. | |
| 2021/0039245 | A1 | 2/2021 | Kukucka et al. | |

FOREIGN PATENT DOCUMENTS

| | | | |
|---|---|---|---|
| AU | 201612721 | | 6/2016 |
| CA | 168071 | | 12/2016 |
| CA | 2898480 | A1 | 7/2017 |
| CN | 2767068 | Y | 3/2006 |
| CN | 3630254 | | 6/2006 |
| CN | 201046555 | Y | 4/2008 |
| CN | 102395447 | | 3/2012 |
| CN | 102554833 | A | 7/2012 |
| CN | 303924849 | | 11/2016 |
| CN | 303956827 | | 12/2016 |
| CN | 303984883 | | 12/2016 |
| DE | 10321284 | A1 | 12/2004 |
| DE | 202010006146 | U1 | 7/2010 |
| EP | 1731774 | A1 | 12/2006 |
| GB | 906839 | A | 9/1962 |
| GB | 1294764 | A | 11/1972 |
| JP | 2011143522 | | 7/2011 |
| JP | 2012157913 | | 10/2011 |
| JP | 2015180835 | A | 7/2017 |
| KR | 200149097 | Y1 | 8/1998 |
| RU | 2152870 | C1 | 7/2000 |
| RU | 2225786 | C2 | 1/2001 |
| RU | 116398 | | 5/2012 |
| RU | 180548 | U1 | 6/2018 |
| TW | M476029 | U | 4/2014 |
| WO | WO9416862 | A1 | 8/1994 |
| WO | WO9710926 | | 3/1997 |
| WO | WO9932264 | | 7/1999 |
| WO | WO0166312 | A1 | 9/2001 |
| WO | WO2005070621 | | 8/2005 |
| WO | WO2006023374 | | 3/2006 |
| WO | WO2006130490 | A1 | 12/2006 |
| WO | WO2010007402 | A1 | 1/2010 |
| WO | 090809 | | 4/2016 |

(56) References Cited

FOREIGN PATENT DOCUMENTS

| | | | |
|---|---|---|---|
| WO | WO2016051080 | A1 | 4/2016 |
| WO | 091188 | | 5/2016 |
| WO | 091189 | | 5/2016 |
| WO | WO2017178997 | | 10/2017 |
| WO | WO2018172831 | | 9/2018 |
| WO | WO2019012486 | | 1/2019 |
| WO | WO2019167032 | | 9/2019 |
| WO | WO2019175652 | | 9/2019 |
| WO | WO2020039281 | | 2/2020 |
| WO | WO2020039285 | | 2/2020 |
| WO | WO2020058777 | | 3/2020 |
| WO | WO2020152516 | | 7/2020 |
| WO | WO2020208608 | | 10/2020 |
| WO | WO2020225800 | | 11/2020 |
| WO | WO2021001696 | | 1/2021 |
| WO | WO2021019500 | | 2/2021 |
| WO | WO2021033152 | | 2/2021 |

* cited by examiner

ANTI-SLIP TORQUE TOOL

The current application is a continuation-in-part (CIP) application of a U.S. non-provisional application Ser. No. 17/006,272 filed on Aug. 28, 2020. The U.S. non-provisional application Ser. No. 17/006,272 claims a priority a U.S. non-provisional application Ser. No. 16/033,970 filed on Jul. 12, 2018. The U.S. non-provisional application Ser. No. 16/033,970 claims a priority to the U.S. Provisional Patent application Ser. No. 62/531,828 filed on Jul. 12, 2017. The U.S. non-provisional application Ser. No. 16/033,970 also claims a priority to the U.S. Provisional Patent application Ser. No. 62/639,619 filed on Mar. 7, 2018.

The current application also claims priority to a Patent Cooperation Treaty (PCT) application PCT/IB20/58278 filed on Sep. 4, 2020. The PCT application PCT/IB20/58278 claims a priority to a U.S. non-provisional application Ser. No. 17/006,272 filed on Aug. 28, 2020.

FIELD OF THE INVENTION

The present invention relates generally to tools designed for tightening or loosening fasteners, in particular bolts and nuts. More specifically, the present invention is an anti-slip torque tool designed to engaged bolts, nuts, and other similar fasteners with little chance of slippage through two sets of engagement teeth.

BACKGROUND OF THE INVENTION

Hex bolts, nuts, screws, and other similar threaded devices are used to secure and hold multiple parts together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, binding the associated components together. The head is the means by which the fastener is turned, or driven, into the female threading. The head is shaped specifically to allow an external tool like a wrench to apply a torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on the head portion. This is generally caused by either a worn fastener or tool, corrosion, overtightening, and damage to the head portion of the fastener. The present invention is a wrench or wrench socket design that virtually eliminates slippage. The present invention uses a plurality of recessed regions in the internal sidewalls of the socket in order to ensure that significant contact is made between the tool and the head portion. Additionally, the present invention eliminates the need for the common bolt extractors as they require unnecessary drilling and tools.

DETAIL DESCRIPTIONS OF THE INVENTION

All illustrations of the drawings are for the purpose of describing selected versions of the present invention and are not intended to limit the scope of the present invention.

The present invention is an anti-slip torque tool used to tighten or loosen any fastener such as a nut or bolt. Traditional wrench and wrench socket designs transfer the majority of the torque to the fastener through the lateral corners of the fastener head. Over time, the degradation of the lateral corners reduces the efficiency of transferring torque from the wrench to the fastener head and, as a result, causes slippage. The present invention overcomes this problem through the use of grooves integrated into the lateral surfaces of the torque tool which provide an additional gripping or biting point for the fastener head, regardless of the wear and tear of the fastener head.

The present invention utilizes sets of teeth and serrations to engage the lateral bracing surface of the fastener head, damaged or otherwise, in order to efficiently apply torque onto the fastener. The sets of teeth allow an improved grip to be applied on to the fastener head by a torque tool. The present invention may be integrated into or utilized by a variety of general tools to increase the torque force applied to a fastener. General tools include, but are not limited to, open-end wrenches, adjustable wrenches, pipe wrenches, socket wrenches, plumber wrench, and other similar fastener engaging tools. The present invention is compatible with male-member based head designs of fasteners. Fasteners which utilize a male-member head design, also known as male fasteners, use the external lateral surface of the fastener head to engage a tool for tightening or loosening, such fasteners include hex bolts and nuts. In addition, the present invention is compatible with fasteners of a right-hand thread and fasteners of a left-hand thread. Furthermore, the present invention may be altered and configured to fit different types and different sizes of fasteners.

Figure 1:
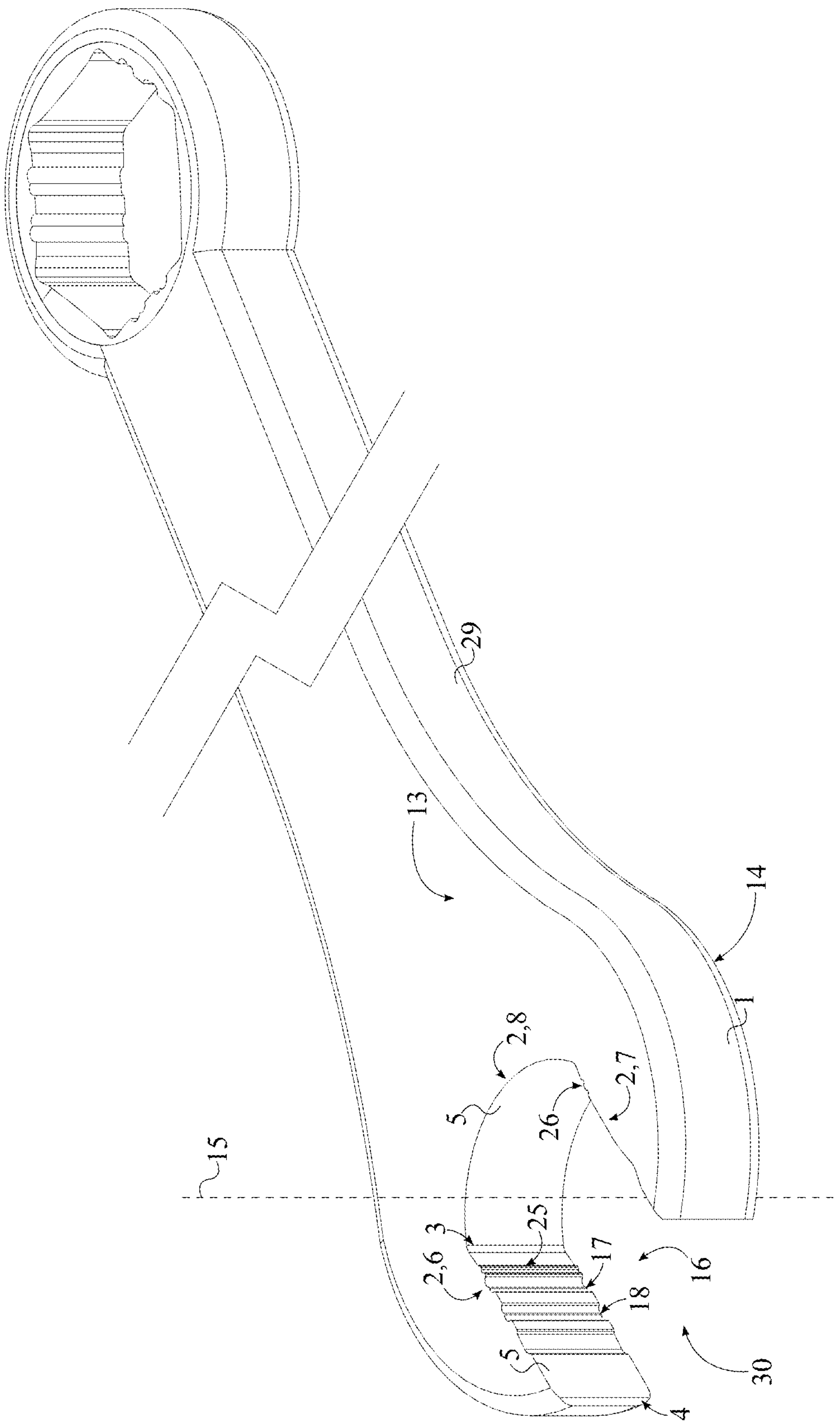
FIG. 1 is a perspective view of the present invention.

In reference to FIG. 1, the present invention comprises a wrench torque-tool body 1 and an at least one engagement element 16. The wrench torque-tool body 1 is used as a physical structure to apply torque onto the fastener head. The wrench torque-tool body 1 comprises a plurality of internal sidewalls 2, a first base 13, and a second base 14. The length, width, and diameter of the wrench torque-tool body 1 may vary to fit different sized fasteners. The plurality of internal sidewalls 2 delineates a fastener-receiving cavity that is shaped complimentary to the fastener being engaged. In particular, the plurality of internal sidewalls 2 is radially distributed about a pivot axis 15 of the wrench torque-tool body 1. Additionally, each of the plurality of internal sidewalls 2 comprises a first lateral edge 3, a second lateral edge 4, and a bracing surface 5.

Figure 2:
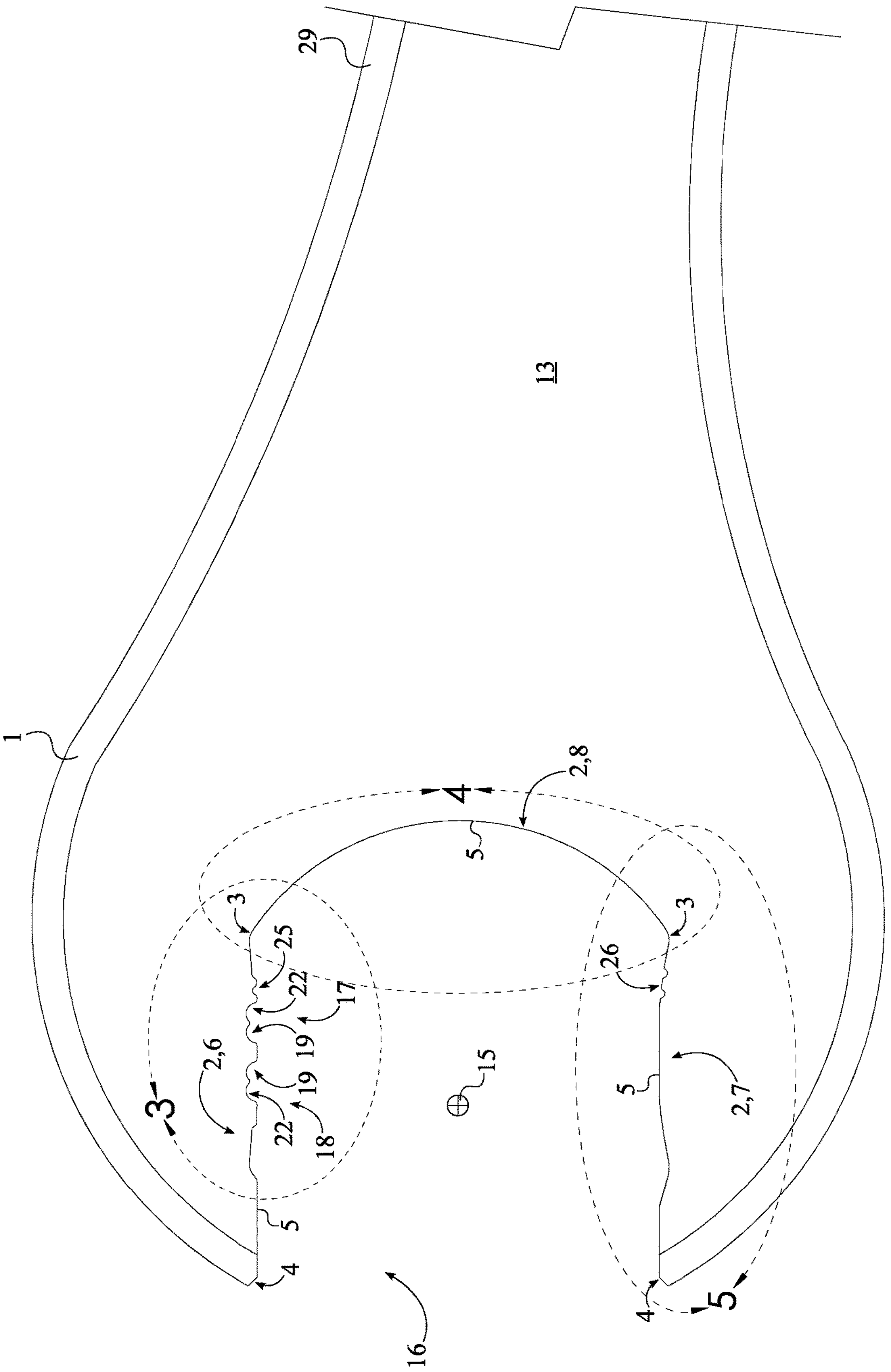
FIG. 2 is a top enlarged view of the present invention.

The engagement element 16 prevents slippage between the wrench torque-tool body 1 and the fastener head. In general, the engagement element 16 is a tooth-like feature that is laterally integrated into a specific sidewall 6 from the plurality of internal sidewalls 2, wherein the specific sidewall 6 denotes any from the plurality of internal sidewalls 2. Referring to FIG. 1 and FIG. 2, the engagement element 16 comprises at least one first groove 17 and at least one second groove 18. The at least one first groove 17 and the at least one second groove 18 are positioned offset from each other along the bracing surface 5 of the specific sidewall 6 to delineate an engagement tooth in between thereof. More specifically, the at least one first groove 17 and the at least one second groove 18 each comprise a primary cavity 19 and a secondary cavity 22. The primary cavity 19 and the secondary cavity 22 each traverses normal and into the bracing surface 5 of the specific sidewall 6. Additionally, the primary cavity 19 and the secondary cavity 22 each traverses into the wrench torque-tool body 1 from the first base 13 to the second base 14, thus ensuring that the engagement tooth extends along the pivot axis 15 of the wrench torque-tool body 1.

Figure 3:
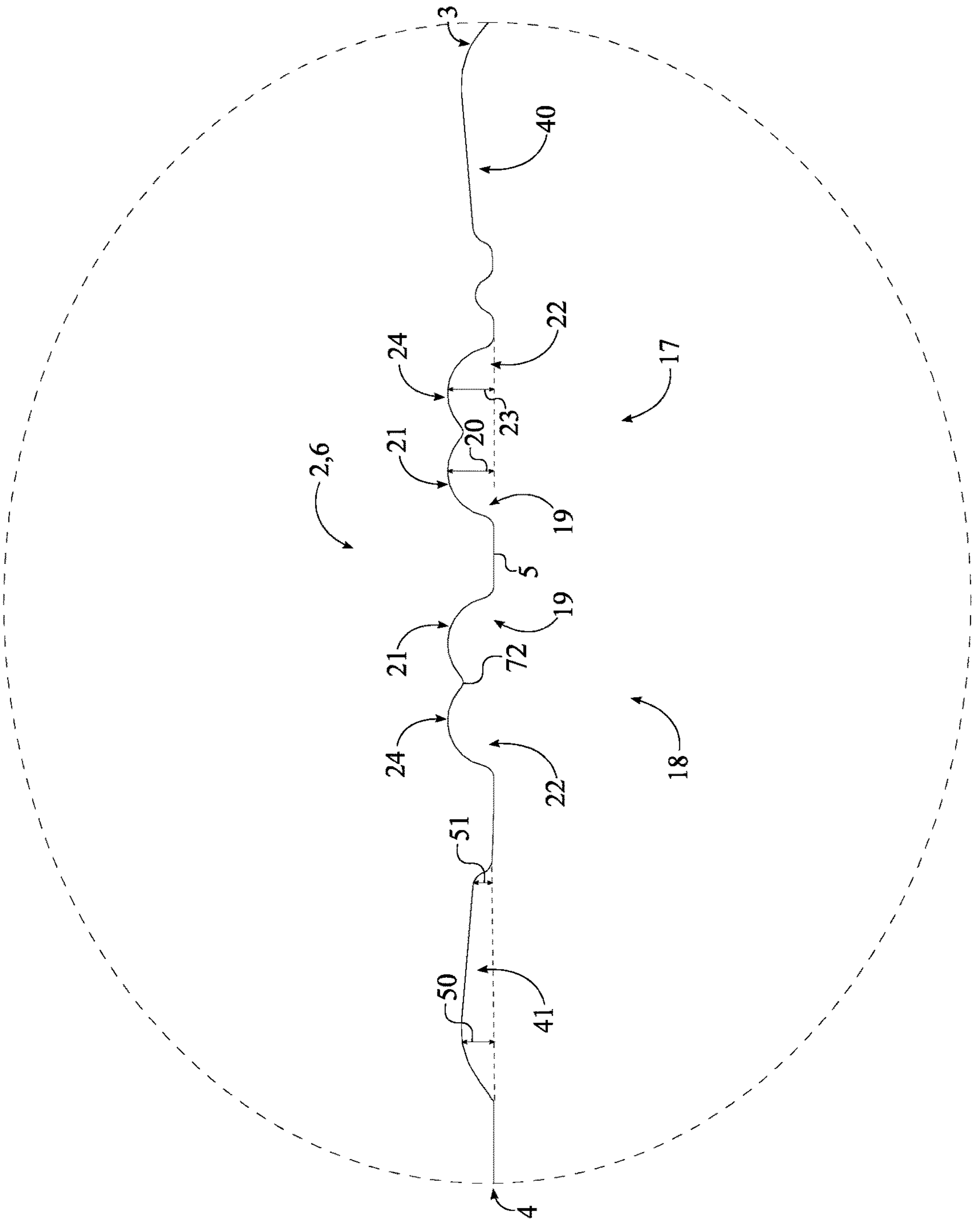
FIG. 3 is a detailed view taken about oval section 3 in FIG. 2.

The present invention is designed to provide a multitude of gripping points in both clockwise and counter-clockwise directions. For the most efficient gripping action and symmetrical design, the engagement element 16 (the at least one first groove 17 and the at least one second groove 18) is preferably centrally positioned in between the first lateral edge 3 and the second lateral edge 4 of the specific sidewall 6. Although, alternative positioning for the at least one first groove 17 and the at least one second groove 18 may be implemented as well, the determining factor being the engagement tooth of the bracing surface 5 positioned between the at least one first groove 17 and the at least one second groove 18 positioned to engaged about the center of the lateral bracing surface of a male fastener head. Additionally, the at least one first groove 17 and the at least one second groove 18 are oriented towards each other; more specifically, the primary cavity 19 from the at least one first groove 17 is positioned adjacent to the primary cavity 19 from the at least one second groove 18 as seen in FIG. 3. Resultantly, the at least one first groove 17 and the at least one second groove 18 mirror each other about a sagittal plane of the bracing surface 5 of the specific sidewall 6. This creates a symmetrical engagement tooth that is capable of providing gripping action to the fastener head in either the clockwise or counter-clockwise rotation. Furthermore, when engaged with a male hexagonal fastener, it is preferred the bracing surface 5 of the specific sidewall 6 that is positioned in between the at least one first groove 17 and the at least one second groove 18 is generally engaged with the center of the male hexagonal fastener.

Referring to FIG. 2 and FIG. 3, the at least one first groove 17 and the at least one second groove 18 are designed with minimum stress points. More specifically, an entire cross-section 21 of the primary cavity 19 is preferably, but not limited to, a partially-circular profile; wherein the partially circular profile is concave along a direction from the first lateral edge 3 to the second lateral edge 4 of the specific sidewall 6. Similarly, an entire cross-section 24 of the secondary cavity 22 is preferably, but not limited to, a partially circular profile; wherein the partially circular profile is concave along a direction from the first lateral edge 3 to the second lateral edge 4 of the specific sidewall 6. Resultantly, the primary cavity 19 and the secondary cavity 22 each have minimum number of possible high stress points, thus increasing the durability and life of the present invention. The depth, size, location, orientation, and curvature of the primary cavity 19 and the secondary cavity 22 are subject to change to meet the needs and preferences of the user.

Preferably, the bracing surface 5 of the specific sidewall 6 and the at least one first groove 17 are adjoined by a radial corner that is also known as a curved corner, and the bracing surface 5 of the specific sidewall 6 and the at least one second groove 18 are also adjoined by a radial corner that is also known as a curved corner. However, the bracing surface 5 of the specific sidewall 6 and the at least one first groove 17 can be adjoined by an angled corner or a sharp corner, and the bracing surface 5 of the specific sidewall 6 and the at least one second groove 18 can be adjoined by an angled corner or a sharp corner.

Referring to FIG. 3, the at least one first groove 17 and the at least one second groove 18 are designed to provide significant gripping action and further each comprises a first gripping point and a second gripping point. The first gripping point and the second gripping point are formed by the configuration and location of the primary cavity 19 and the secondary cavity 22. The primary cavity 19 and the secondary cavity 22 partially intersect each other thus delineating an intersecting portion 72 that is positioned offset from the bracing surface 5 of the specific sidewall 6. The first gripping point is formed at the intersecting portion 72 in between the secondary cavity 22 and the primary cavity 19. The second gripping point is formed by the intersecting portion 72 of the primary cavity 19 and the bracing surface 5 of the specific sidewall 6, the engagement tooth specifically. The second gripping point is, more specifically, positioned opposite the first gripping point, across the primary cavity 19. Resultantly, three different contact points are used to transfer torque to the fastener head depending on the wear and tear of the fastener head. Accordingly, if the fastener head is not stripped, then the bracing surface 5 of the plurality of internal sidewalls 2 applies the torque force. If the fastener head is partially stripped, then an engaging corner of the fastener head slips past the specific sidewall 6 and falls into the secondary cavity 22 of the at least one first groove 17 and engages the first gripping point of the at least one first groove 17. An identical process occurs when the engaging corner engages the first gripping point of the at least one second groove 18.

Figure 6:
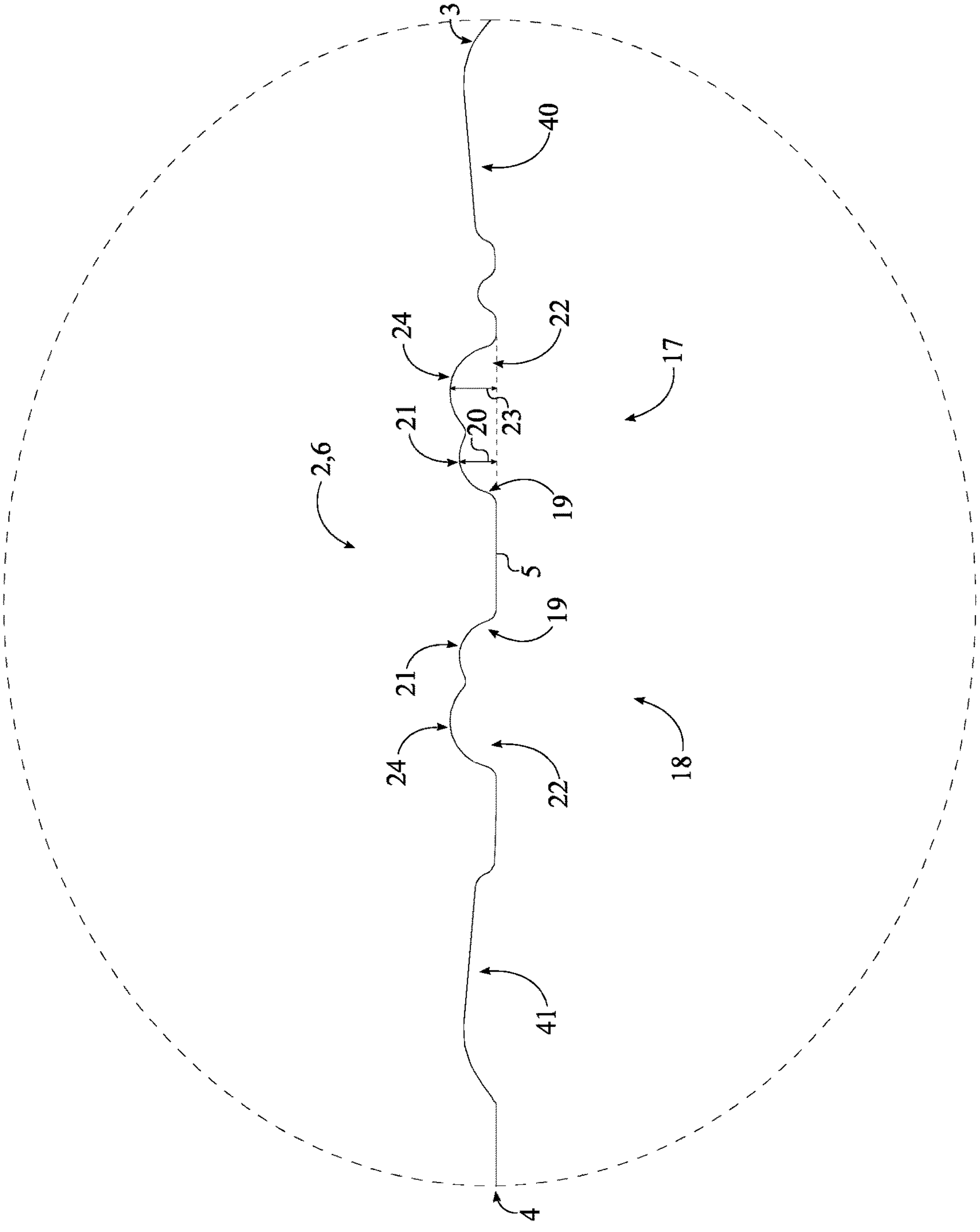
FIG. 6 is an alternative detailed view of the primary cavity and the secondary cavity of the present invention.
Figure 7:
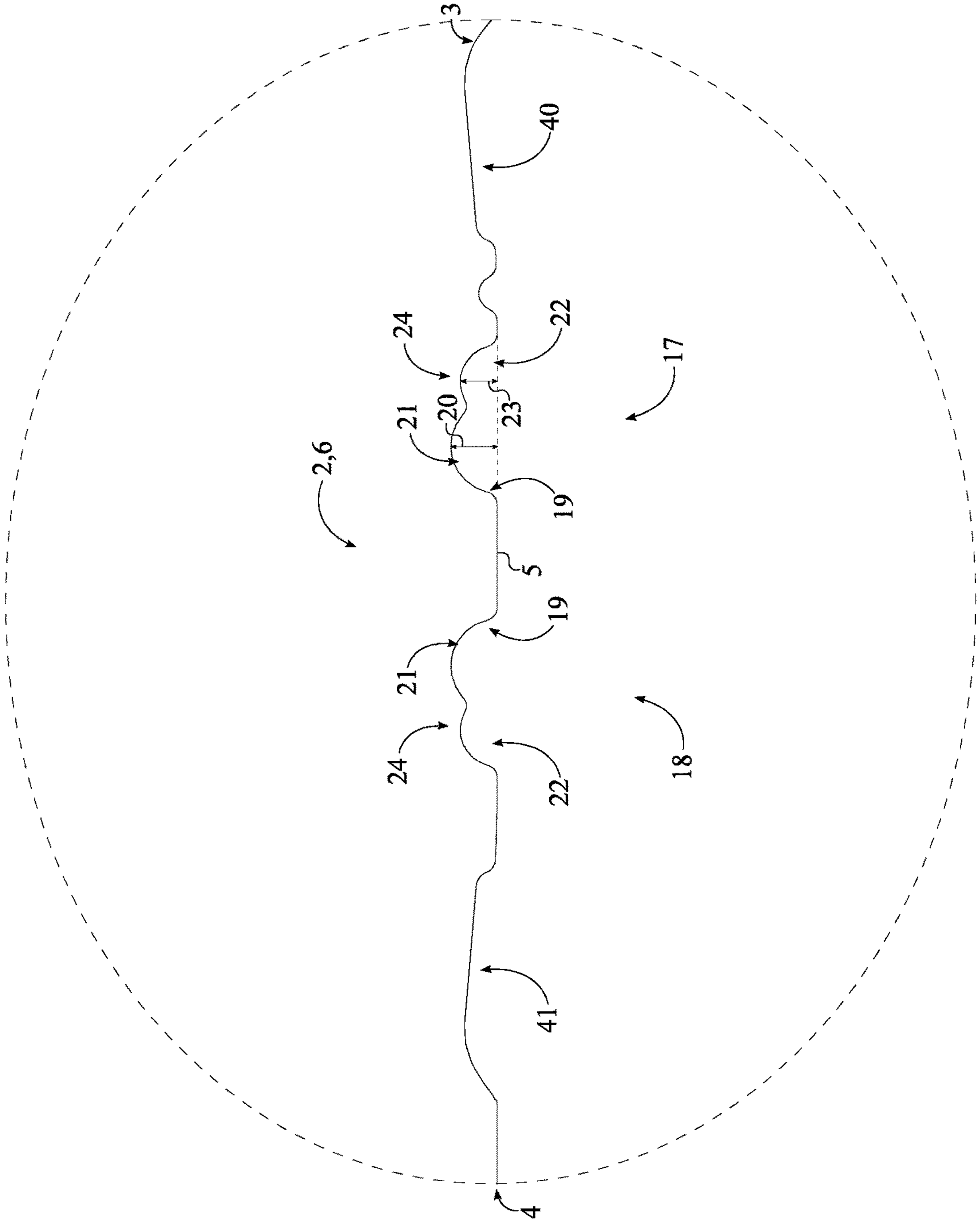
FIG. 7 is another alternative detailed view of the primary cavity and the secondary cavity of the present invention.

The present invention is able to provide different configurations for the primary cavity 19 and the secondary cavity 22 based upon the three different contact points. Preferably, a depth 23 of the secondary cavity 22 is equal to a depth 20 of the primary cavity 19 within the present invention as shown in FIG. 3. However, in some embodiment of the present invention, the depth 23 of the secondary cavity 22 can be greater than the depth 20 of the primary cavity 19 as shown in FIG. 6. Oppositely, in some embodiments of the present invention, the depth 20 of the primary cavity 19 can be greater than the depth 23 of the secondary cavity 22 as shown in FIG. 7.

Furthermore, the primary cavity 19 and the secondary cavity 22 can each comprise a first side surface, a second side surface, and a base surface. More specifically, the first side surface and the second side surface are oppositely positioned of each other about the base surface. The intersecting point between each surface can be a sharp angular point or a smooth radius point, wherein the intersecting points functions as additional gripping points within the present invention. The first side surface is selected from the group consisting of: a flat surface, a convex surface, and a concave surface so that the overall profile of the primary cavity 19 and the secondary cavity 22 can differ with respect to the first side surface. The second side surface is selected from the group consisting of: a flat surface, a convex surface, and a concave surface so that the overall profile of the primary cavity 19 and the secondary cavity 22 can differ with respect to the second side surface. The base surface is selected from the group consisting of: a flat surface, a convex surface, and a concave surface so that the overall profile of the primary cavity 19 and the secondary cavity 22 can differ with respect to the base surface. The primary cavity 19 and the secondary cavity 22 can be formed with just two side surfaces as in overall profile is shaped into a V-shaped or triangular shaped if desired for ease of manufacturing and cost purpose or superior structural integrity and performance.

If the fastener head is significantly stripped or rounded then the fastener engaging corner slips past the specific sidewall 6 and the first gripping point and becomes lodged against the second gripping point of the at least one first groove 17. An identical process occurs when the engaging corner engages the second gripping point of the at least one second groove 18 instead. The engaging corner is a specific corner of the fastener head that is closest to either the at least one first groove 17 or the at least one second groove 18. The intersecting portion 72 between the primary cavity 19 and the secondary cavity 22 is preferably not colinear with the bracing surface 5 of the sidewall 6 as shown in FIG. 3. However, in alternative embodiment, the intersecting portion 72 between the primary cavity 19 and the secondary cavity 22 may be colinear with the bracing surface 5 of the sidewall 6

In one embodiment of the present invention, referring to FIG. 2, the engagement element 16 further comprises at least one primary serration 25. Each within the at least one primary serration 25 is a tooth feature designed to provide an additional gripping point. The size, depths, design, and number within the at least one primary serration 25 is subject to change. The at least one primary serration 25 is positioned in between the at least one first groove 17 and the first lateral edge 3 of the specific sidewall 6 as preferred by the user; in particular the at least one primary serration 25 is a multitude of teeth that are serially distributed in between the first lateral edge 3 of the specific sidewall 6 to the at least one first groove 17. The at least one primary serration 25 is laterally integrated into the bracing surface 5 of the specific sidewall 6; and, additionally, each within the at least one primary serration 25 extends from the first base 13 to the second base 14 to ensure adequate surface contact between the at least one primary serration 25 and the fastener head. The at least one primary serration 25 is preferably designed for an open-end wrench in a clockwise rotation, however, the open-end wrench can also be designed without the at least one primary serration 25 if desired.

In one embodiment of the present invention, the engagement element 16 further comprises at least one secondary serration 26. Each within the at least one secondary serration 26 is a tooth feature designed to provide an additional gripping point. The size, depths, design, and number within the at least one secondary serration 26 is subject to change. The at least one secondary serration 26 provides additional gripping points. In particular, the at least one secondary serration 26 is positioned adjacent to the first lateral edge 3 of an opposing sidewall 7 from the plurality of internal sidewalls 2; wherein the opposing sidewall 7 is positioned parallel and opposite to the specific sidewall 6, across the wrench torque-tool body 1. Additionally, the at least one secondary serration 26 is laterally integrated into the bracing surface 5 of the opposing sidewall 7 with each within the at least one secondary serration 26 extending from the first base 13 to the second base 14. The at least one secondary serration 26 is preferably designed for an open-end wrench in a clockwise rotation, however, the open-end wrench can also be designed without the at least one secondary serration 26 if desired.

The plurality of internal sidewalls 2 is designed to further facilitate the engagement between the fastener head and the engagement element 16. More specifically, the plurality of internal sidewalls 2 comprises an arbitrary sidewall 10 and an adjacent sidewall 11; wherein the arbitrary sidewall 10 denotes any from the plurality of internal sidewalls 2. Preferably, the arbitrary sidewall 10 is adjacently adjoined to the adjacent sidewall 11 by a curved corner. Resultantly, corners formed within the plurality of internal sidewalls 2 are curved to a certain degree, the degree is subject to change to meet the needs and preferences of the user. At the extreme, the curved corners are implemented as a semi-circular hole traversing into and along the wrench torque-tool body 1 as seen in FIG. 1. Alternatively, the arbitrary sidewall 10 is adjacently adjoined to the adjacent sidewall 11 by an angled corner. Resultantly, corners formed within the plurality of internal sidewalls 2 are angled to a certain degree, the degree is subject to change to meet the needs and preferences of the user. Another alternative feature which promotes the engagement between the fastener head and the engagement element 16 is the curvature of each of the plurality of internal sidewalls 2. More specifically, an entire cross-section 12 for each of the plurality of internal sidewalls 2 may be a partially-circular profile; wherein the partially-circular profile is convex along a direction from the first lateral edge 3 to the second lateral edge 4. This positions the engagement points of the engagement element 16 closer to the pivot axis 15, and thus closer to the sides of the fastener head. The plurality of internal sidewalls 2 is preferably flat about the bracing surface 5.

Figure 4:
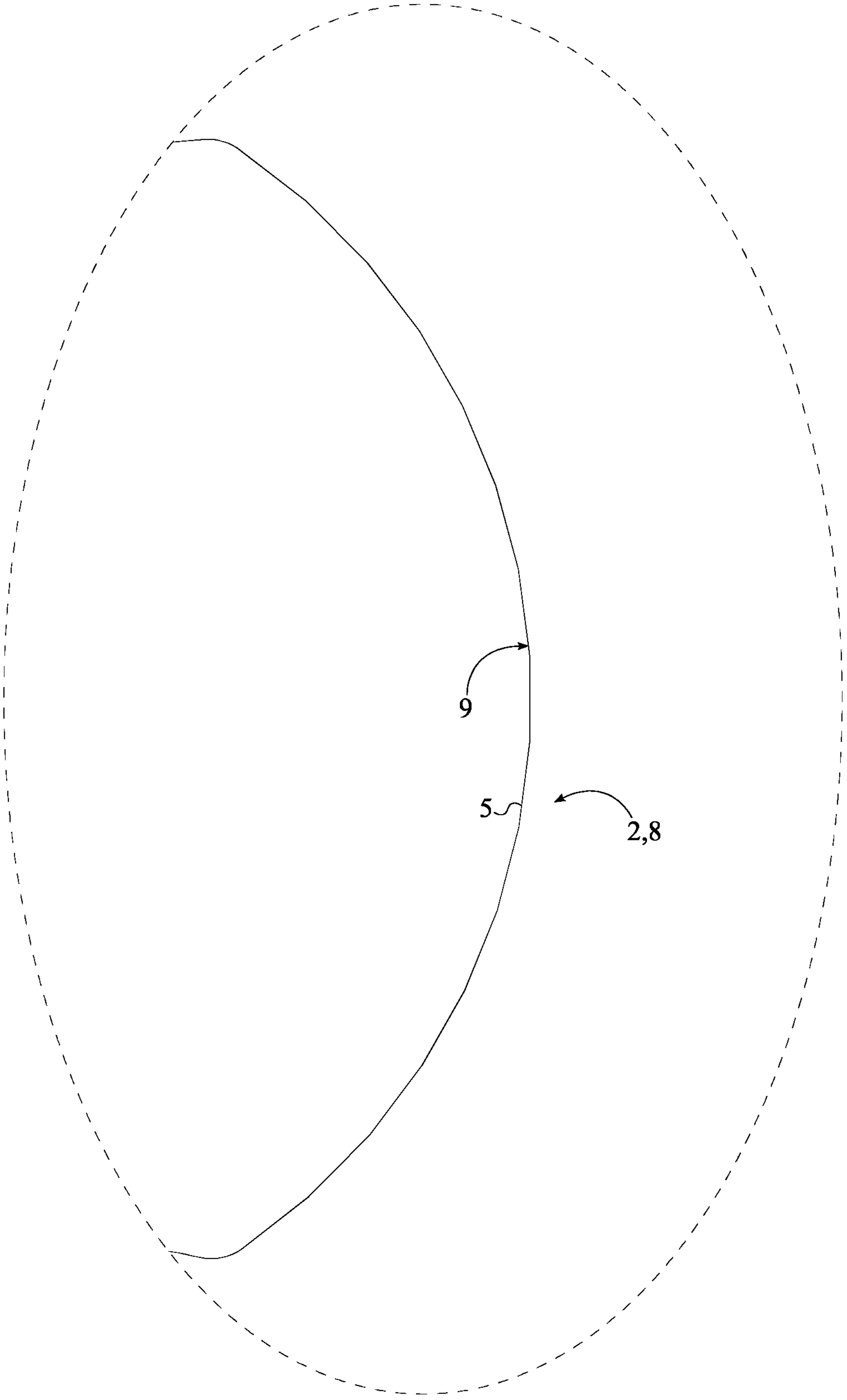
FIG. 4 is a detailed view taken about oval section 4 in FIG. 2.
Figure 5:
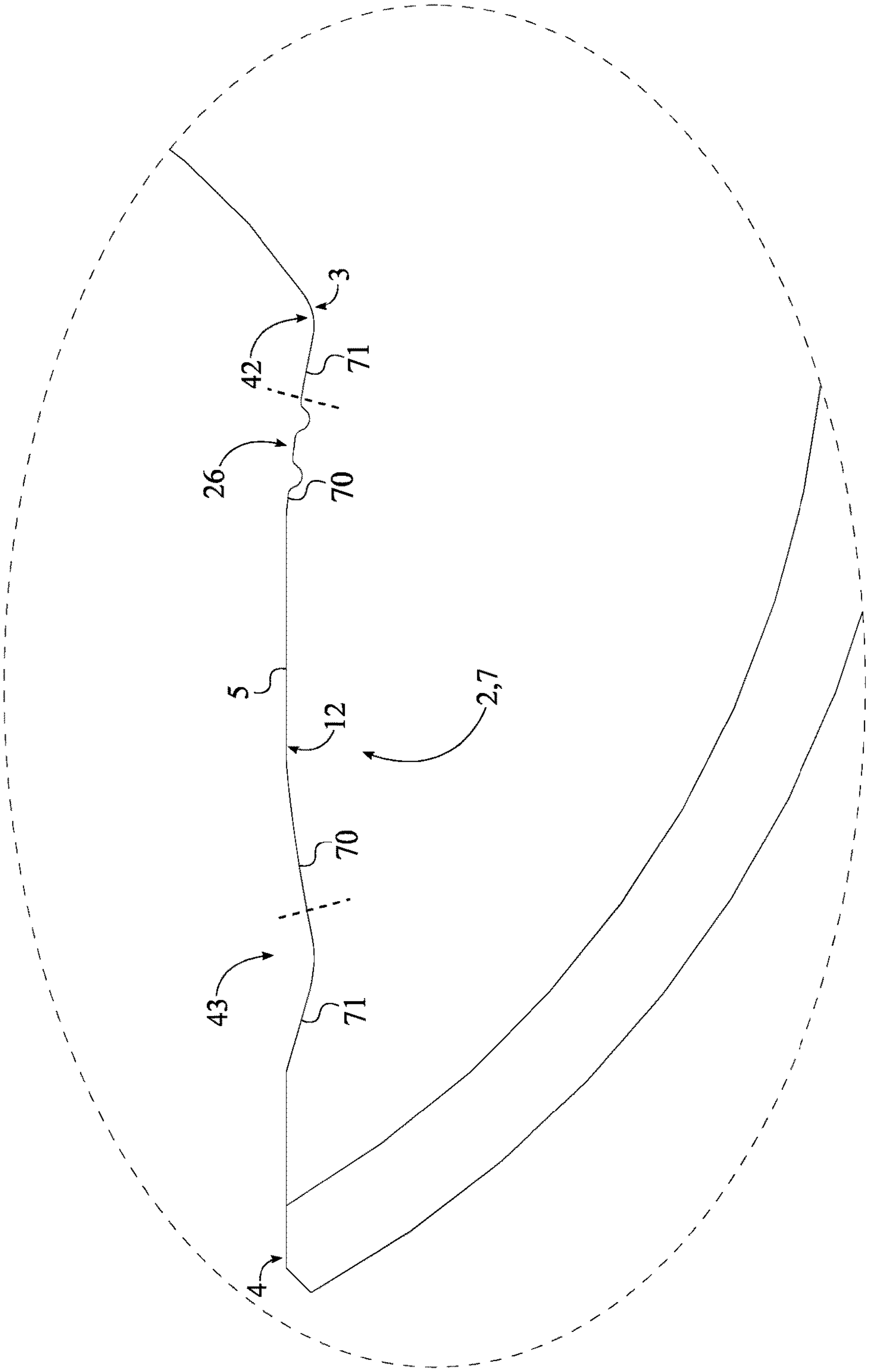
FIG. 5 is a detailed view taken about oval section 5 in FIG. 2.

Furthermore, the plurality of internal sidewalls 2 is specifically curved for maximum clearance and engagement. In particular, an intermediate sidewall 8 from the plurality of internal sidewalls 2 is perpendicularly positioned in between the specific sidewall 6 and the opposing sidewall 7. The intermediate sidewall 8 is concave shaped to provide clearance for the fastener head and to increase the chances for the fastener head to engage the engagement element 16. More specifically, referring to FIG. 4, an entire cross-section 9 of the intermediate sidewall 8 is a partially-circular profile; wherein the partially-circular profile is concave along a direction from the first lateral edge 3 to the second lateral edge 4 of the intermediate sidewall 8. Furthermore, the specific sidewall 6 and the opposing sidewall 7 may be convex curved, as described above, or partially convex and partially flat, to additionally position the engagement element 16 close to the pivot axis 15 as seen in FIG. 5.

Referring to FIG. 1-2, wherein the present invention is an open-end wrench with multiple gripping features, the present invention further comprises a fastener-receiving hole 30, a wrench handle 29, a first cavity 40, a second cavity 41, a third cavity 42, a fourth cavity 43. It is preferred that the bracing surface 5 of the opposing sidewall 7 is a flat surface about the center in between the third cavity 42 and the fourth cavity 43, and a slight convex shape between the flat surface and the third cavity 42 and the fourth cavity 43 which taper away from the flat surface. It is therefore obvious a perpendicular length between the portion of the bracing surface 5 of the specific sidewall 6 in between the at least one first groove 17 and the at least one second groove 18 and the flat surface for the bracing surface 5 of the opposing sidewall 7 are less than a perpendicular length between the first cavity 40 and the third cavity 42 or a perpendicular length between the second cavity 41 and the fourth cavity 43.

The fastener-receiving hole 30 allows the present invention to engage the fastener head laterally, similar to traditional open-end wrenches, as seen in FIG. 1. In particular, the fastener-receiving hole 30 traverses through the wrench torque-tool body 1, perpendicular to the pivot axis 15. Additionally, the fastener-receiving hole 30 is preferably positioned opposite the wrench handle 29 and the intermediate sidewall 8, across the wrench torque-tool body 1. In relation to the engagement element 16, the fastener-receiving hole 30 is oriented parallel to the specific sidewall 6.

The wrench handle 29 is externally and laterally connected to the wrench torque-tool body 1 and acts as a lever arm to substantially increase the torque force applied to the fastener. The length of the wrench handle 29 may vary depending on the torque force required to remove the fastener; a longer wrench handle 29 produces a greater torque force and vice versa. Furthermore, the general shape, design, and material composition of the wrench handle 29 may also vary to accommodate the needs of the user. For example, the wrench handle 29 may be padded at various regions to alter the handling characteristics of the tool to increase ease of use and comfort for the user.

In reference to FIG. 3, the first cavity 40 is positioned adjacent to the first lateral edge 3 of the specific sidewall 6 to further prevent damage or slippage of the fastener adjacent to the intermediate sidewall 8. More specifically, the first cavity 40 traverses normal and into the bracing surface 5 of the specific sidewall 6 in such a way that the first cavity 40 is extended from the first base 13 to the second base 14. When torque is applied to the fastener through the wrench handle 29, the first cavity 40 makes no contact with a lateral edge of the fastener about the first lateral edge 3 of the specific sidewall 6 thus efficiently transferring the applied torque to the fastener and preventing slippage or damage to the fastener. Furthermore, when the at least one primary serration 25 is positioned in between the at least one first groove 17 and the first lateral edge 3 of the specific sidewall 6, the first cavity 40 is positioned in between the first lateral edge 3 of the specific sidewall 6 and the at least one primary serration 25.

In reference to FIG. 3, the second cavity 41 is positioned in between the second lateral edge 4 of the specific sidewall 6 and the at least one second groove 18 to further prevent damage or slippage of the fastener adjacent to the fastener-receiving hole 30. More specifically, the second cavity 41 traverses normal and into the bracing surface 5 of the specific sidewall 6 in such a way that the second cavity 41 is extended from the first base 13 to the second base 14. When torque is applied to the fastener through the wrench handle 29, the second cavity 41 makes no contact with a lateral edge of the fastener about the second lateral edge 4 of the specific sidewall 6 thus efficiently transferring the applied torque to the fastener and preventing slippage or damage to the fastener.

In reference to FIG. 5, the third cavity 42 is positioned adjacent to the first lateral edge 3 of the opposing sidewall 7 to further prevent damage or slippage of the fastener adjacent to the intermediate sidewall 8. More specifically, the third cavity 42 traverses normal and into the bracing surface 5 of the opposing sidewall 7 in such a way that the third cavity 42 is extended from the first base 13 to the second base 14. Furthermore, the third cavity 42 comprises a convex portion 70 and a concave portion 71 that delineate the curvature. More specifically, the convex portion 70 and the concave portion 71 are adjacently connected to each other. The concave portion 71 is positioned adjacent to the first lateral edge 3 of the opposing sidewall 7, and the convex portion 70 is positioned adjacent to the bracing surface 5 of the opposing sidewall 7.

When torque is applied to the fastener through the wrench handle 29, the third cavity 42 makes no contact with a lateral edge of the fastener about the first lateral edge 3 of the opposing sidewall 7 thus efficiently transferring the applied torque to the fastener and preventing slippage or damage to the fastener. Furthermore, when the at least one secondary serration 26 is positioned adjacent to the first lateral edge 3 of the opposing sidewall 7, the at least one secondary serration 26 is positioned within the convex portion 70 of the third cavity 42.

third cavity 42 is positioned in between the first lateral edge 3 of the opposing sidewall 7 and the at least one secondary serration 26.

In reference to FIG. 5, the fourth cavity 43 is positioned adjacent to the second lateral edge 4 of the opposing sidewall 7 to further prevent damage or slippage of the fastener adjacent to the intermediate sidewall 8. More specifically, the fourth cavity 43 traverses normal and into the bracing surface 5 of the opposing sidewall 7 in such a way that the fourth cavity 43 is extended from the first base 13 to the second base 14. When torque is applied to the fastener through the wrench handle 29, the fourth cavity 43 makes no contact with a lateral edge of the fastener about the second lateral edge 4 of the opposing sidewall 7 thus efficiently transferring the applied torque to the fastener and preventing slippage or damage to the fastener. Furthermore, when the at least one secondary serration 26 is positioned adjacent to the first lateral edge 3 of the opposing sidewall 7, the fourth cavity 43 is positioned in between the second lateral edge 4 of the opposing sidewall 7 and the bracing surface 5 of the opposing sidewall 7. Furthermore, the fourth cavity 43 also comprises the convex portion 70 and the concave portion 71 that delineate the curvature. More specifically, the convex portion 70 and the concave portion 71 are adjacently connected to each other. The concave portion 71 is positioned adjacent to the second lateral edge 4 of the opposing sidewall 7, and the convex portion 70 is positioned adjacent to the bracing surface 5 of the opposing sidewall 7.

The bracing surface 5 is selected from the group consisting of: a flat surface, a convex surface, a concave surface, and a combination of thereof upon different embodiments of the present invention. In other words, the bracing surface 5 of the specific sidewall 6 can be a flat surface, a convex surface, a concave surface, and combination of thereof due to the placement of the engagement element 16, the first cavity 40, and the second cavity 41. The bracing surface 5 of the opposing sidewall 7 can be a flat surface, a convex surface, a concave surface, and combination of thereof due to the placement of the engagement element 16, the third cavity 42, the fourth cavity 43, and the at least one secondary serration 26. The bracing surface 5 of the intermediate sidewall 8 can be a flat surface, a convex surface, a concave surface, and combination of thereof due to radial configuration of the first lateral edge 3 and the second lateral edge 4 of the intermediate sidewall 8.

The first cavity 40, the second cavity 41, the third cavity 42, and the fourth cavity 43 each comprise a first side section, a second side section, and a base section. More specifically, the first side section and the second side section can be a convex section, a concave section, or a straight section. The base section is preferably a flat surface that is tapered towards the at least one first groove 17, the at least one second groove 18, the set of second serrations 26, or the bracing surface 5 of the opposing sidewall 7. The first side section is adjacently connected to a proximal end of the base section and positioned adjacent to the fastener-receiving hole 30 or the intermediate sidewall 8. The second side section is adjacently connected to a distal end of the base section and positioned adjacent to the bracing surface 5. In other words, a first depth 50 that is configured about the intersecting point between the first side section and the proximal end the base section is greater than a second depth 51 that is configured about the intersecting point between the second side section and the distal end of the base section that is positioned adjacent to the bracing surface 5 as shown in FIG. 3. The base section may be parallel and not taper if desired as well as a concave or convex surface with the alternative embodiments or sections. For example, the first cavity 40, the second cavity 41, the third cavity 42, and the fourth cavity 43 may yield shapes of triangular, circular, partially circular, trapezoidal, rectangular, and square or any other shape geometrical shape. By tapering base section away from the first cavity 40 and the second cavity 41, as shown in FIG. 3, and away from third cavity 42 and the fourth cavity 43, as shown in FIG. 5, the present invention provides greater clearance for fastener lateral edge which further prevent damage or slippage of the fastener. In other words, the clearance between the lateral edge of the fastener and the base section of first cavity 40, the second cavity 41, the third cavity 42, and the fourth cavity 43 when engaged in the wrench is greater than the clearance between the base section of the first cavity 40, the second cavity 41, the third cavity 42, and the fourth cavity 43 the flank portion of the fastener.

Furthermore, the primary serrations 25 and the secondary serrations 26 may be shaped into a triangular, circular, partially circular, trapezoidal, rectangular, square or any other shape possible, wherein peaks and troughs of the primary serrations 25 and the secondary serrations 26 may be either sharp or radial in nature.

In one embodiment of the present invention, the primary cavity 19 and the secondary cavity 22 overlap each other to yield one continuous cavity. This provides a larger receiving space for the corners of the fastener head, ideal for severely damaged fastener heads. In this embodiment the at least one primary serration 25 is positioned in between the at least one first groove 17 and the at least one second groove 18, thus ensuring adequate grip in between the fastener head and the present invention. In particular, the at least one primary serration 25 extends from the at least one first groove 17 to the at least one second groove 18. It is preferred for this embodiment, that the present invention is an open-end wrench implementation with the addition of the at least one secondary serration 26, as described above. However, the features of this embodiment may be implemented in a box end or open ended wrench as described previously. All intersection between the bracing surface 5, the first cavity 40, the second cavity 41, the third cavity 42, and the fourth cavity 43, indentations, the at least one first groove 17, the at least one second groove 18, curved corners, angular corners or deviations may be implemented with sharp, angular, or radius corners of all or any of the embodiments in the present invention.

Figure 8:
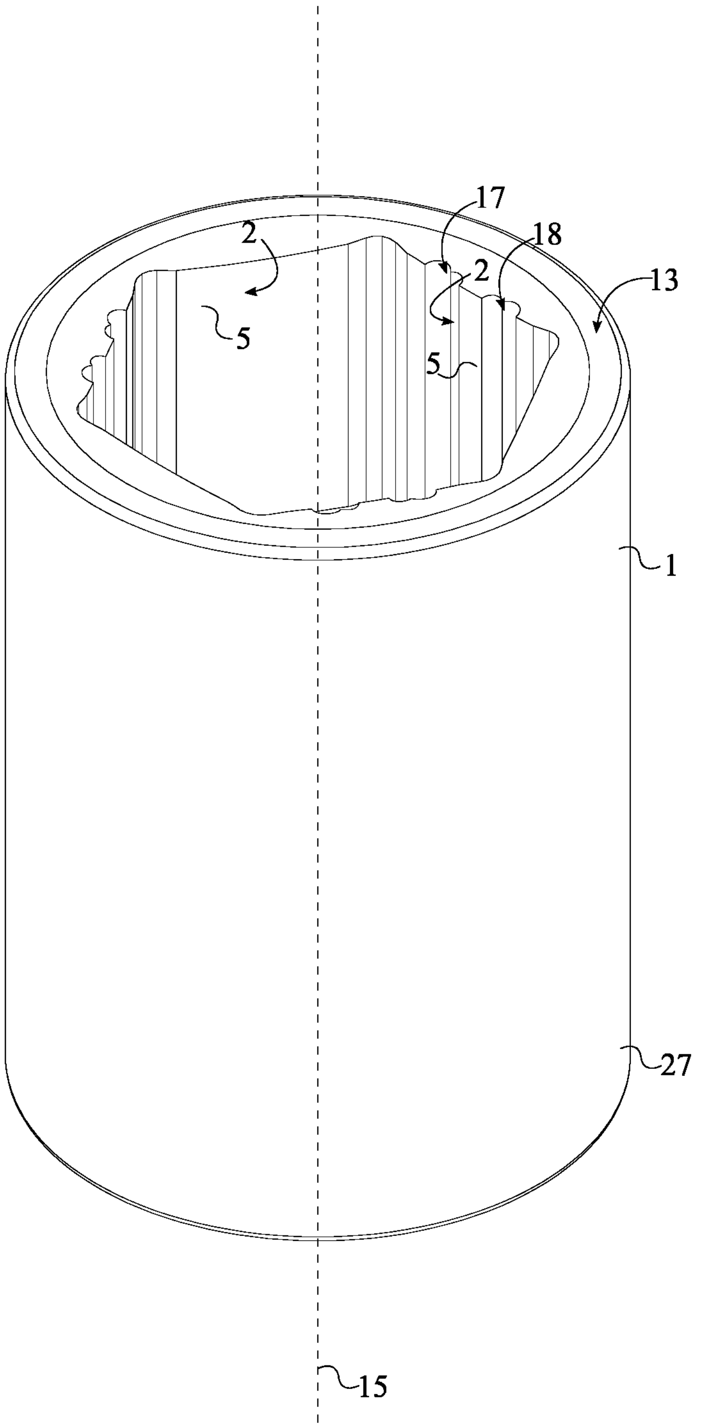
FIG. 8 is a perspective view of an alternative embodiment of the present invention.
Figure 12:
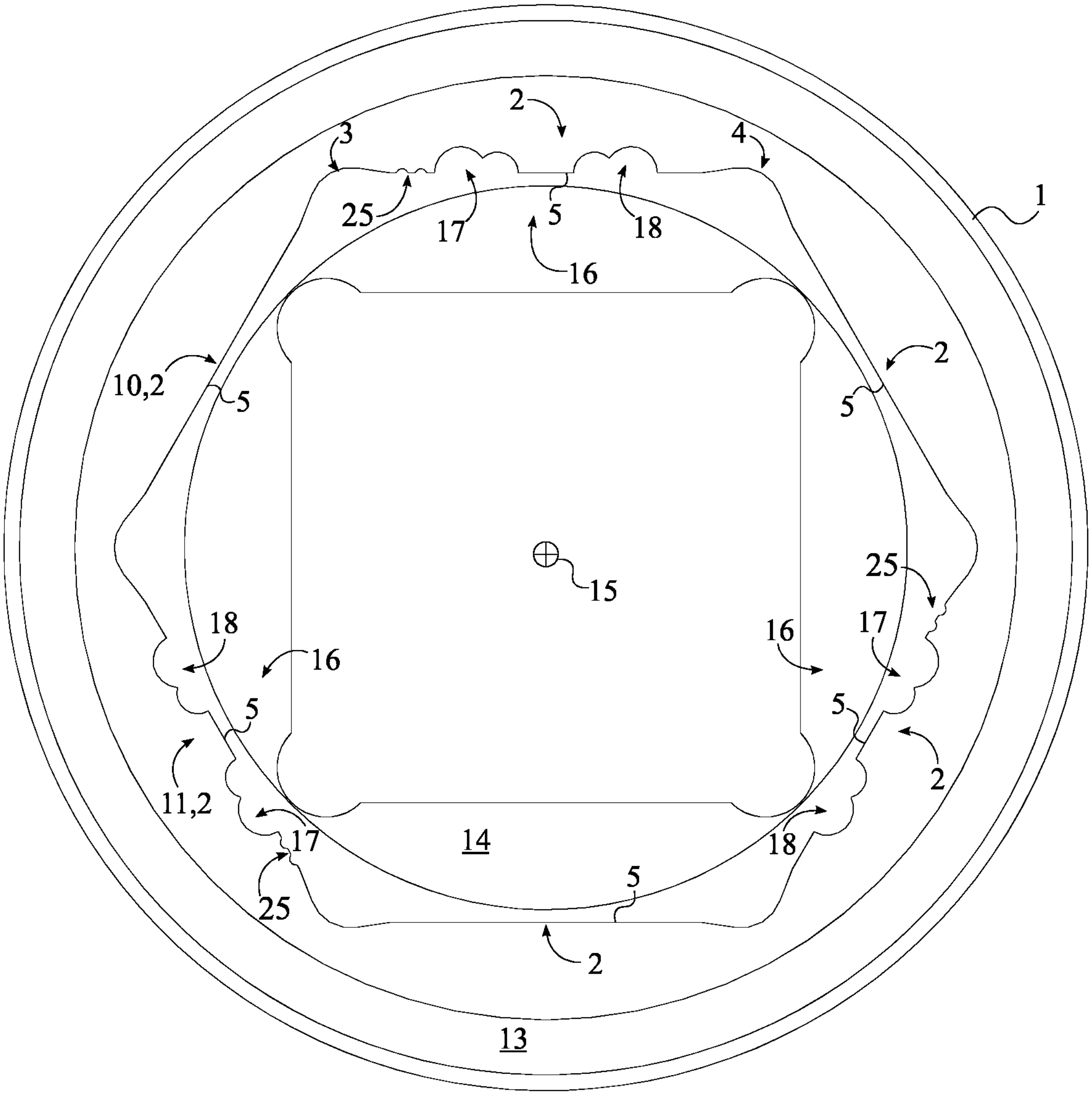
FIG. 12 is a top enlarged view of another embodiment of the present invention.

Referring to FIG. 1 and FIG. 8, in one embodiment of the present invention, the plurality of engagement elements 16 is radially distributed about the pivot axis 15 with each of the plurality of engagement elements 16 being laterally integrated into a corresponding sidewall from the plurality of internal sidewalls 2. The number within the plurality of engagement elements 16 to the number within the plurality of internal sidewalls 2 is subject to change. In one embodiment the plurality of engagement elements 16 equals the plurality of internal sidewalls 2. In another embodiment, the plurality of engagement elements 16 is distributed amongst every other from the plurality of internal sidewalls 2 as seen in FIG. 8. FIG. 12 depicts an embodiment of the present invention wherein each within the plurality of engagement elements 16 may or may not comprise the at least one primary serration 25. For example, the wrench torque-tool body 1 is a tubular extrusion sized to fit over the male fastener in an interlocking manner, essentially a wrench socket or a closed-end wrench.

Figure 9:
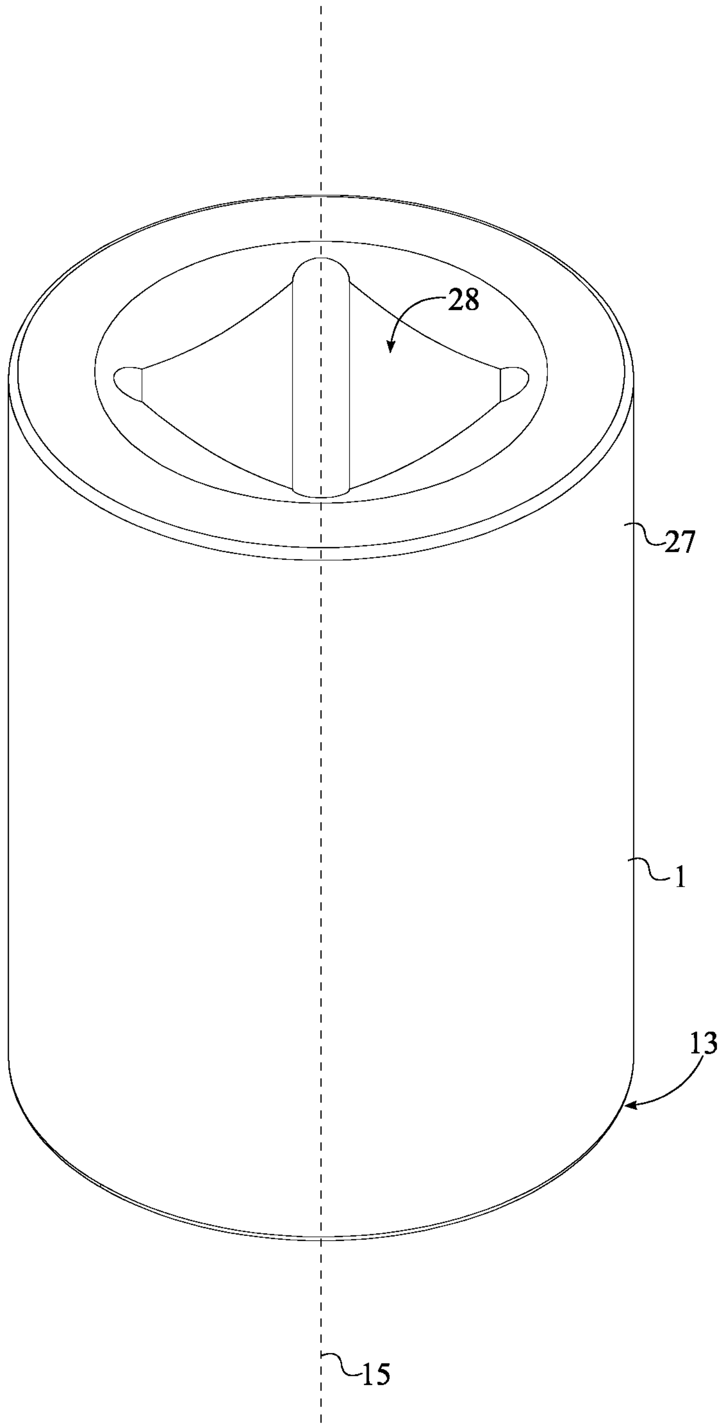
FIG. 9 is a bottom perspective view of the alternative embodiment.
Figure 10:
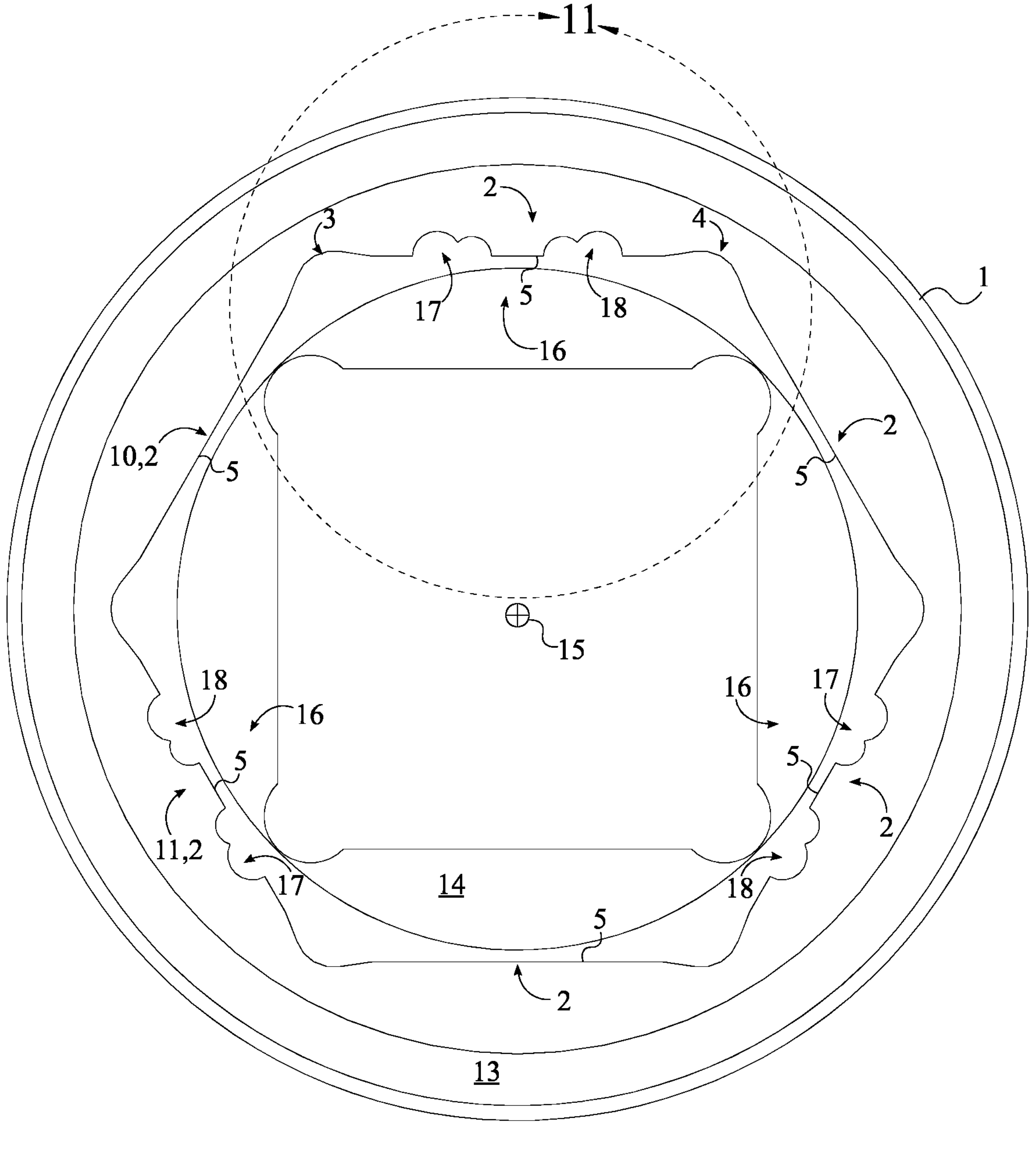
FIG. 10 is a top view of the alternative embodiment of the present invention.
Figure 11:
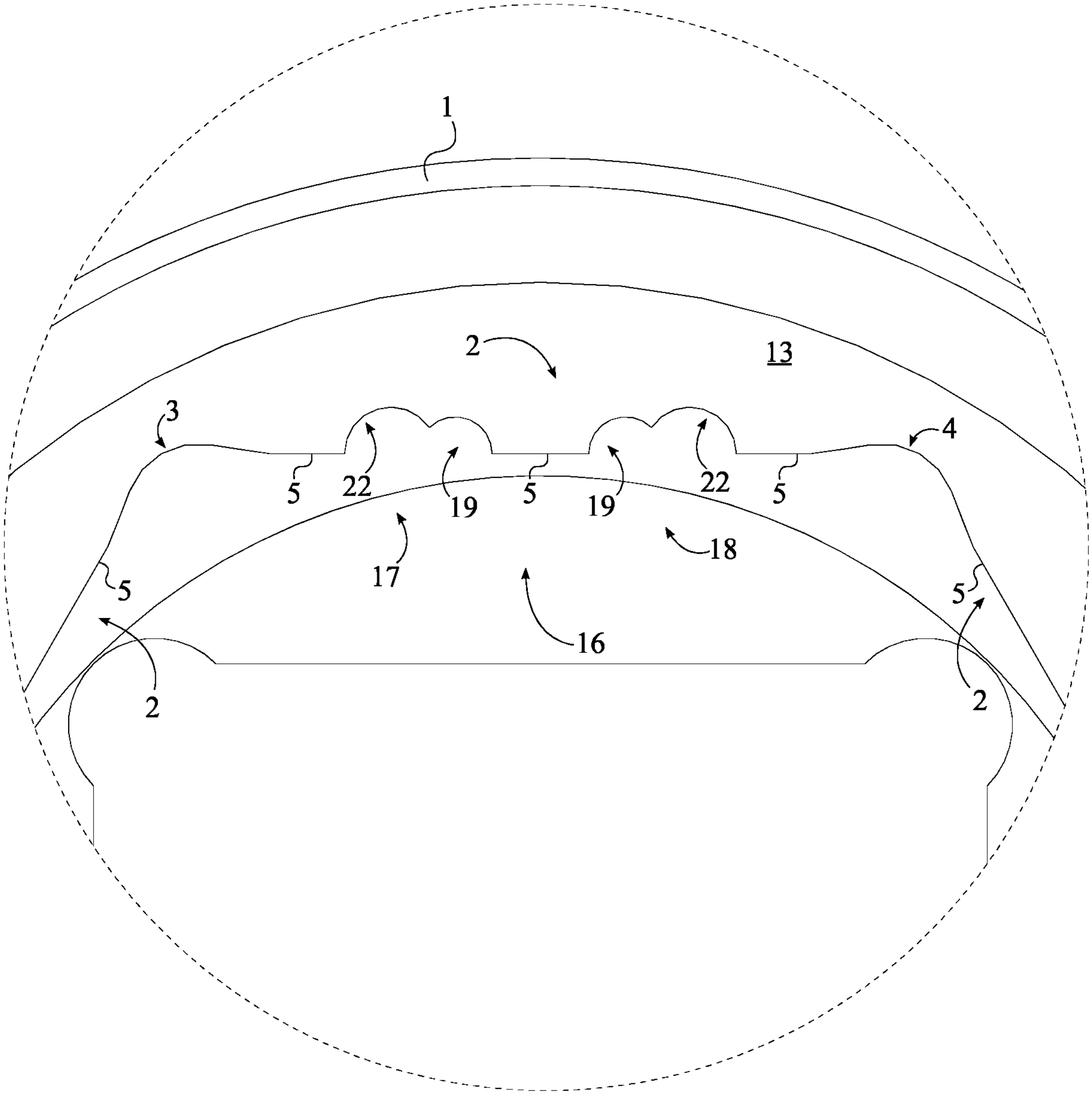
FIG. 11 is detailed view taken about circle section 11 in FIG. 8.

The present invention also incorporates an attachment feature which allows an external torque tool to attach to the wrench torque-tool body 1 and increase the torque force applied to the fastener. Referring to FIG. 9, the present invention comprises an attachment body 27 and an engagement bore 28 that allow an external tool such as a socket wrench or ratchet to be attached to the wrench torque-tool body 1. The attachment body 27 is centrally positioned around and along the pivot axis 15 in order to align with the axis wrench torque-tool body 1 as seen in FIG. 8. The attachment body 27 is preferably of a cylindrical design with a diameter slightly larger than the diameter of the wrench torque-tool body 1, however the attachment body 27 may be the same side or smaller in diameter than wrench torque tool body The engagement bore 28 traverses into the attachment body 27 along the pivot axis 15, opposite the wrench torque-tool body 1. The engagement bore 28 is shaped to receive a male attachment member of a socket wrench; the preferred shape is square as the majority of socket wrenches utilize a square attachment member. In alternative embodiments, the shape and design of the engagement bore 28 and the attachment body 27 may vary to be adaptable to different torque tools and different attachment means. In one embodiment, only the attachment body 27 is utilized; wherein the attachment body 27 is shaped to fit within an external wrench. In particular, the attachment body 27 is hexagonal shaped for example, although other geometric shapes may also be utilized.

Although the invention has been explained in relation to its preferred embodiment, it is to be understood that many other possible modifications and variations can be made without departing from the spirit and scope of the invention as hereinafter claimed.

What is claimed is:

1. An anti-slip torque tool comprises:

a wrench torque-tool body;

an at least one engagement element;

a second cavity;

a third cavity;

a fourth cavity;

the wrench torque-tool body comprises a plurality of internal sidewalls, a first base, and a second base;

each of the plurality of internal sidewalls comprises a first lateral edge, a second lateral edge, and a bracing surface;

the engagement element comprises at least one first groove and at least one second groove;

the plurality of internal sidewalls being radially distributed about a pivot axis of the wrench torque-tool body;

the engagement element being laterally integrated into a specific sidewall from the plurality of internal sidewalls;

the engagement element being centrally positioned in between the first lateral edge and the second lateral edge of the specific sidewall;

the at least one first groove and the at least one second groove being positioned offset from each other along the bracing surface of the specific sidewall;

the second cavity being positioned in between the second lateral edge of the specific sidewall and the at least one second groove;

the second cavity traversing normal and into the bracing surface of the specific sidewall;

the second cavity being extended from the first base to the second base;

the third cavity being positioned adjacent to the first lateral edge of an opposing sidewall from the plurality of internal sidewalls;

the third cavity traversing normal and into the bracing surface of the opposing sidewall;

the third cavity being extended from the first base to the second base;

the fourth cavity being positioned adjacent to the second lateral edge of an opposing sidewall from the plurality of internal sidewalls;

the fourth cavity traversing normal and into the bracing surface of the opposing sidewall;

the fourth cavity being extended from the first base to the second base;

the fourth cavity comprising a convex portion and a concave portion;

the convex portion and the concave portion being adjacently connected to each other;

the concave portion being positioned adjacent to the second lateral edge of the opposing sidewall from the plurality of internal sidewalls; and the convex portion being positioned adjacent to the bracing surface of the opposing sidewall.

2. The anti-slip torque tool as claimed in claim 1 comprises:

a wrench handle; and the wrench handle being externally and laterally connected to the wrench torque-tool body.

3. The anti-slip torque tool as claimed in claim 2 comprises:

a fastener-receiving hole;

the fastener-receiving hole traversing through the wrench torque-tool body, perpendicular to the pivot axis;

the fastener-receiving hole being positioned opposite the wrench handle, across the wrench torque-tool body; and the fastener-receiving hole being oriented parallel to the specific sidewall.

4. The anti-slip torque tool as claimed in claim 1 comprises:

at least one primary serration;

the at least one primary serration being positioned in between the at least one first groove and the first lateral edge of the specific sidewall;

the at least one primary serration being laterally integrated into the bracing surface of the specific sidewall; and each within the at least one primary serration extending from the first base to the second base.

5. The anti-slip torque tool as claimed in claim 1 comprises:

at least one secondary serration;

the at least one secondary serration being positioned adjacent to the first lateral edge of an opposing sidewall from the plurality of internal sidewalls;

the opposing sidewall being positioned parallel and opposite to the specific sidewall, across the wrench torque-tool body;

the at least one secondary serration being laterally integrated into the bracing surface of the opposing sidewall; and each within the at least one secondary serration extending from the first base to the second base.

6. The anti-slip torque tool as claimed in claim 1 comprises:

a first cavity;

the first cavity being positioned adjacent to the first lateral edge of the specific sidewall;

the first cavity traversing normal and into the bracing surface of the specific sidewall; and the first cavity being extended from the first base to the second base.

7. The anti-slip torque tool as claimed in claim 6 comprises:

at least one primary serration; and the first cavity being positioned in between the first lateral edge of the specific sidewall and the at least one primary serration.

8. The anti-slip torque tool as claimed in claim 1 comprises:

the third cavity comprising a convex portion and a concave portion;

the convex portion and the concave portion being adjacently connected to each other;

the concave portion being positioned adjacent to the first lateral edge of the opposing sidewall from the plurality of internal sidewalls; and the convex portion being positioned adjacent to the bracing surface of the opposing sidewall.

9. The anti-slip torque tool as claimed in claim 8 comprises:

at least one secondary serration; and the at least one secondary serration being positioned within the convex portion of the third cavity.

10. The anti-slip torque tool as claimed in claim 1 comprises:

an intermediate sidewall from the plurality of internal sidewalls being perpendicularly positioned in between the specific sidewall and an opposing sidewall from the plurality of internal sidewalls;

an entire cross-section of the intermediate sidewall being a partially-circular profile; and the partially-circular profile being concave along a direction from the first lateral edge to the second lateral edge of the intermediate sidewall.

11. The anti-slip torque tool as claimed in claim 1 comprises:

the plurality of internal sidewalls comprising an arbitrary sidewall and an adjacent sidewall; and the arbitrary sidewall adjacently adjoining to the adjacent sidewall by a curved corner.

12. The anti-slip torque tool as claimed in claim 1 comprises:

the plurality of internal sidewalls comprising an arbitrary sidewall and an adjacent sidewall; and the arbitrary sidewall adjacently adjoining to the adjacent sidewall by an angled corner.

13. The anti-slip torque tool as claimed in claim 1 comprises:

the at least one first groove and the at least one second groove each comprise a primary cavity and a secondary cavity;

the primary cavity and the secondary cavity traversing normal and into the bracing surface of the specific sidewall;

the primary cavity and the secondary cavity traversing into the wrench torque-tool body from the first base to the second base; and the primary cavity from the at least one first groove being positioned adjacent to the primary cavity from the at least one second groove.

14. The anti-slip torque tool as claimed in claim 13, wherein a depth of the primary cavity being equal to a depth of the secondary cavity.

15. The anti-slip torque tool as claimed in claim 13, wherein a depth of the primary cavity being greater than a depth of the secondary cavity.

16. The anti-slip torque tool as claimed in claim 13, wherein a depth of the secondary cavity being greater than a depth of the primary cavity.

17. The anti-slip torque tool as claimed in claim 13 comprises:

an intersecting portion;

the primary cavity and the secondary cavity being intersected each other about the intersecting portion; and the intersecting portion being offset from the bracing surface of the specific sidewall.

18. The anti-slip torque tool as claimed in claim 13 comprises:

an entire cross-section of the primary cavity being a partially-circular profile; and the partially-circular profile being concave along a direction from the first lateral edge to the second lateral edge.

19. The anti-slip torque tool as claimed in claim 13 comprises:

an entire cross-section of the secondary cavity being a partially-circular profile; and the partially-circular profile being concave along a direction from the first lateral edge to the second lateral edge.

20. The anti-slip torque tool as claimed in claim 1 comprises:

the at least one engagement element being a plurality of engagement elements;

the plurality of engagement elements being radially distributed about the pivot axis; and each of the plurality of engagement elements being laterally integrated into a corresponding sidewall from the plurality of internal sidewalls.

21. The anti-slip torque tool as claimed in claim 1, wherein the bracing surface is selected from the group consisting of: a flat surface, a convex surface, a concave surface, and a combination of thereof.

22. The anti-slip torque tool as claimed in claim 1, wherein the bracing surface is adjacently adjoining to the at least one first groove by a radial corner.

23. The anti-slip torque tool as claimed in claim 1, wherein the bracing surface is adjacently adjoining to the at least one second groove by a radial corner.

24. The anti-slip torque tool as claimed in claim 1, wherein the bracing surface is adjacently adjoining to the at least one first groove by an angled corner.

25. The anti-slip torque tool as claimed in claim 1, wherein the bracing surface is adjacently adjoining to the at least one second groove by an angled corner.

26. The anti-slip wrench-type tool as claimed in claim 1 comprises:

an attachment body;

an engagement bore;

the attachment body being centrally positioned around and along the pivot axis;

the attachment body being connected adjacent to second base; and the engagement bore traversing into the attachment body along the pivot axis, opposite the wrench torque-tool body.

27. The anti-slip wrench-type tool as claimed in claim 1 comprises:

an intermediate sidewall from the plurality of internal sidewalls being perpendicularly positioned in between the specific sidewall and an opposing sidewall from the plurality of internal sidewalls; and the bracing surface of the intermediate sidewall is selected from the group consisting of: a flat surface and a convex surface.

* * * * *